United States Patent [19]
DuVall et al.

[11] Patent Number: 5,629,681
[45] Date of Patent: May 13, 1997

[54] TUBULAR SONIC DISPLACEMENT SENSOR

[75] Inventors: Wilbur E. DuVall, Kimberling City, Mo.; Wendell C. Johnson, Topanga, Calif.; David S. Breed, Boonton Township, N.J.

[73] Assignee: Automotive Technologies International, Inc., Boonton Township, N.J.

[21] Appl. No.: 443,002

[22] Filed: May 17, 1995

Related U.S. Application Data

[63] Continuation-in-part of Ser. No. 24,076, Mar. 1, 1993, Pat. No. 5,441,301, Ser. No. 239,977, May 9, 1994, and Ser. No. 239,978, May 9, 1994, abandoned.

[51] Int. Cl.$^6$ .................................................. G08B 21/00
[52] U.S. Cl. .......................... 340/665; 340/540; 340/545; 340/621; 340/436; 340/437; 367/908; 73/290 R; 324/643
[58] Field of Search .................................. 340/563, 566, 340/565, 560, 545, 550, 557, 590, 621, 665, 666, 436, 437; 367/93, 94, 191, 908; 73/591, 590, 599, 290; 320/643

[56] References Cited

U.S. PATENT DOCUMENTS

| | | | |
|---|---|---|---|
| 4,590,803 | 5/1986 | Harrold | 73/590 |
| 4,935,723 | 6/1990 | Vallance | 340/550 |
| 5,134,386 | 7/1992 | Swanic | 340/557 |
| 5,261,505 | 11/1993 | Holroyd et al. | 340/436 |
| 5,301,549 | 4/1994 | Sinclair | 340/621 |
| 5,446,446 | 8/1995 | Harman | 340/566 |

*Primary Examiner*—Jeffery Hofsass
*Assistant Examiner*—Benjamin C. Lee
*Attorney, Agent, or Firm*—Samuel Shipkovitz

[57] ABSTRACT

The displacement sensor of this invention comprises a tube combined with a sonic transmitter and receiver. The tube acts as a waveguide for the sonic waves and a processor determines whether the tube has changed in length or has been constricted which, in either case, changes the pattern of sonic waves traveling from the transmitter to the receiver. In some applications, the transmitter and receiver are at different ends of the tube. In these cases, the attenuation in sound energy reaching the receiver, caused by the tube being squeezed at at least one point, is measured and the amount of cross action area reduction is determined. In other applications, the transmitter and receiver are at the same end of the tube and, in some of these cases, the transmitter and receiver are the same transducer. When the transmitter and receiver are at the same end of the tube, the receiver receives sonic waves reflected from a constriction in the tube and the time between transmission and reception of the waves permits the processor to determine the location along the tube of the constriction. The measuring device of this invention can also be used to measure the change in length of the tube or effective length, such as when the tube is partially filled with a liquid.

20 Claims, 18 Drawing Sheets

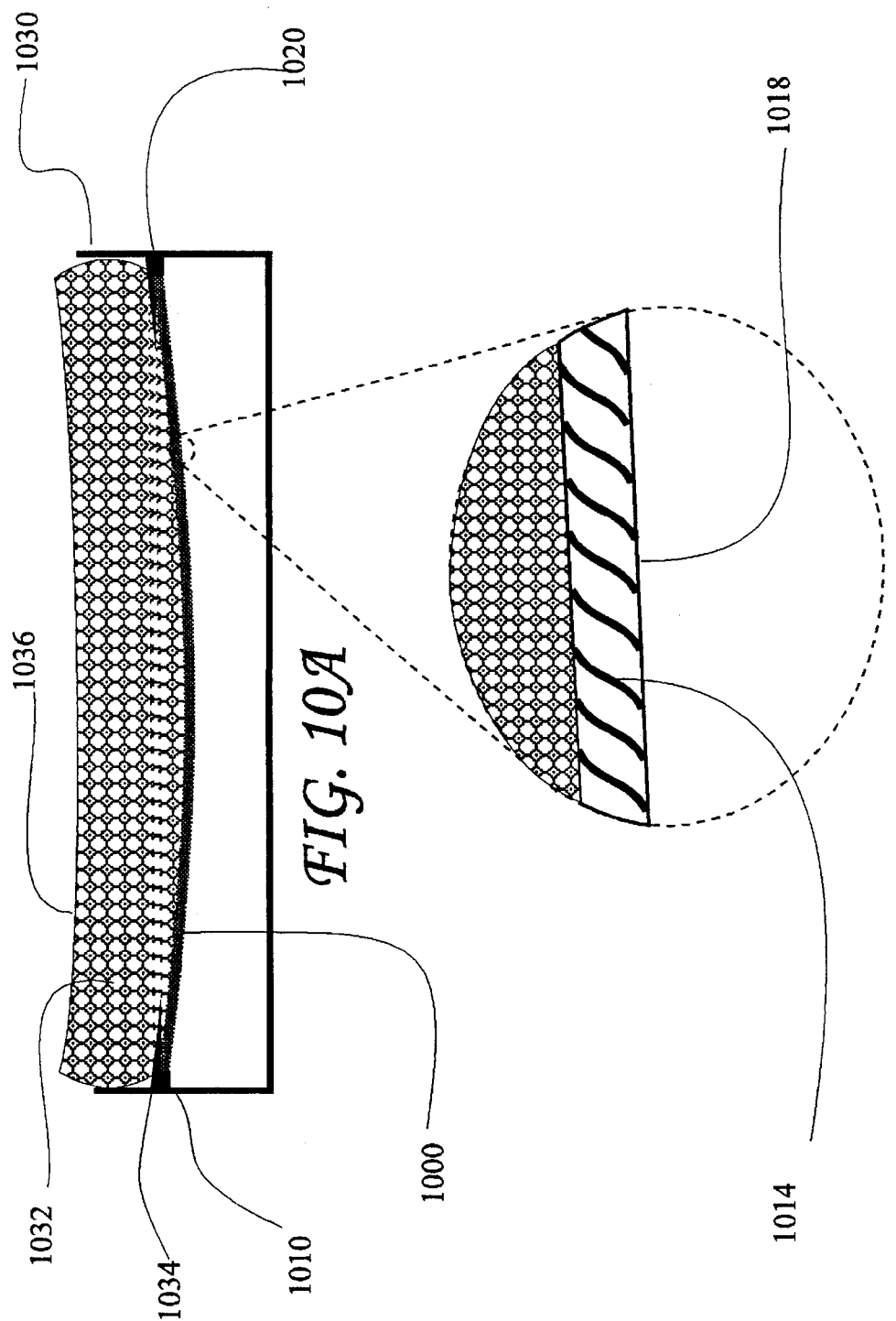

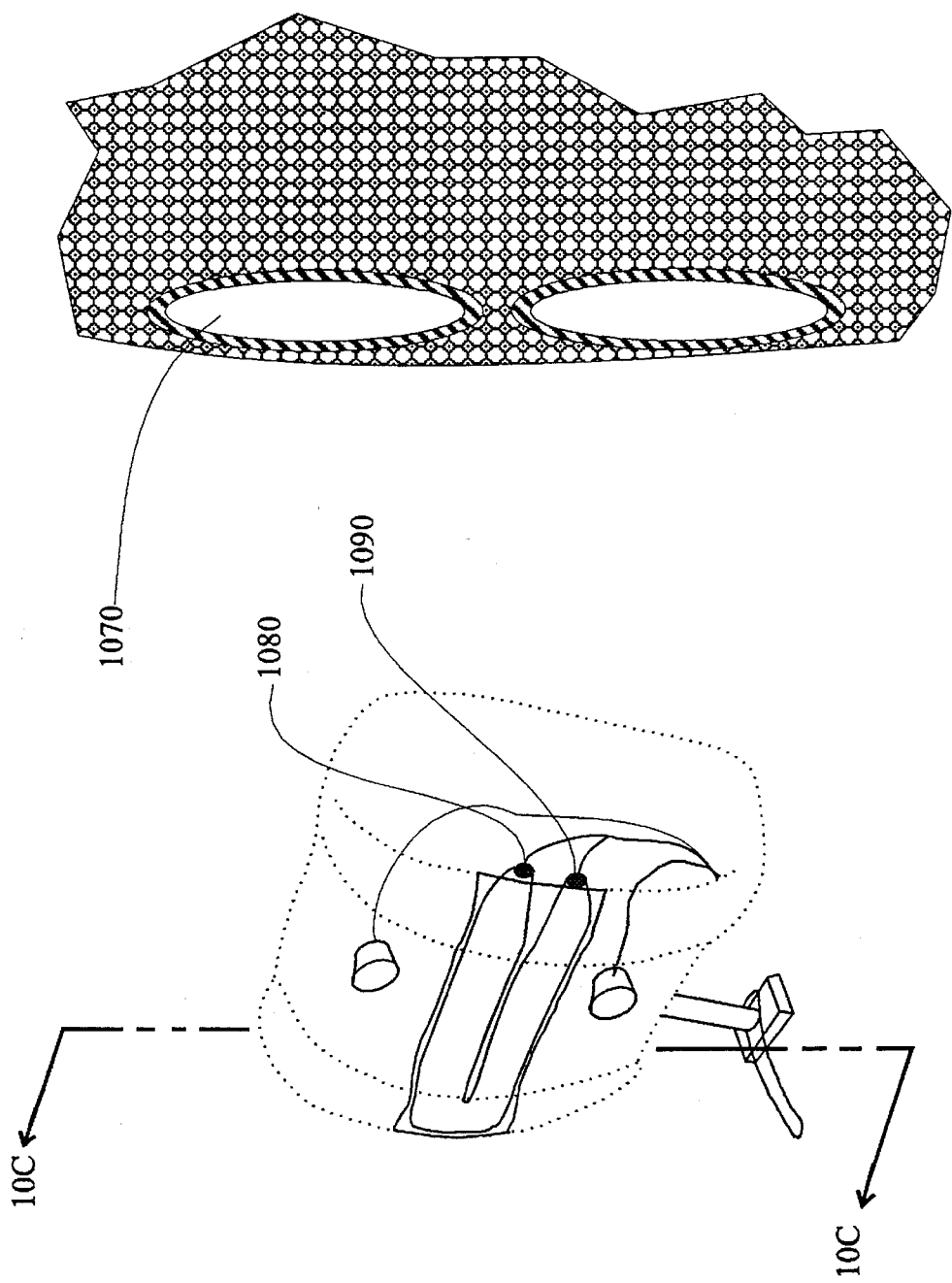

TUBULAR SONIC DISPLACEMENT SENSOR

This invention is a continuation-in-part of Ser. No. 08/024,076 filed Mar. 1, 1993, now U.S. Pat. No. 5,441,301; and Ser. No. 08/239,977 filed May 9, 1994, and Ser. No. 08/239,978 filed May 9, 1994 (ATI-77), now abandoned.

BACKGROUND OF THE INVENTION

This invention uses a tube as a waveguide for sonic, usually ultrasonic, waves and determines whether the tube has changed its length or been radially deformed along its length by measuring the level and timing of reflected or transmitted waves. In general the device can measure the location along the tube and amount of transverse deflection. As such it can be used either as a displacement measuring device or, by determining when a given level of sound is reached, it can be used as a switch.

Two types of linear or tube like switches are in common use. At many gas stations and along various roads, tubes are placed which indicate when they are run over by a vehicle. These switches use the change in air pressure within the tube to ring a bell or trip a counter. Tape switches use two substantially flat and parallel conductors which, when pushed together, complete the switch. These tape switches are used on buses and steering wheels, for example, where a momentary depression perpendicular to the switch is to be sensed. The pneumatic tube switches are rate dependent, that is, in many cases they will not function properly if depressed slowly. Tape switches require that the force be approximately perpendicular to the conductors and thus the orientation of the switch is critical. Also tape switches can only be bent about one axis. In neither of the prior art linear switches can the location of the depression be ascertained nor the amount of depression. They are basically digital devices.

Because of their rate sensitivity, pneumatic tube switches have not found extensive applications beyond those listed above. One use contemplated herein is as an obstruction sensor for use with automobile windows, doors, sunroofs, trunk lids and elevator doors. Pneumatic tube switches are not now used or contemplated for these applications. Tape switches have been considered for some of these applications, however several problems result. The inability to arbitrarily bend the tape switch makes it very difficult to adapt it to irregular contours such as in a trunk lid, for example. Also, it is frequently difficult to place tape switch contacts within weather stripping or other seals which have complex cross section geometries. When tape switches are used it is difficult to maintain the proper orientation of the contacts so that the sensitivity to pressure is constant along the switch. For some cases a wide switch is desirable such as for an obstruction sensor for elevator doors. The use of a tape switch for these cases results in a large switch which is expensive and also difficult to adapt to the door geometry.

Pneumatic tube switches, as well as those of this invention, oiler an advantage over tape switches for applications where electricity can not be tolerated such as in explosive environments. Tape switches, as well as those of this invention, offer advantages over pneumatic tube switches in that both can operate over long distances.

Neither pneumatic tube nor tape switches can measure changes in sensor length which can be accomplished by the sonic tube sensors described below. Applications where this is important include liquid level sensing and weight sensing.

Applications for the displacement sensor described herein include vehicle counting devices for roads; obstruction sensors for windows, doors, sunroofs and trunks; vehicle crash sensors, head contact sensors for headrests; occupant weight measuring sensors for installation in vehicle seats; and fuel level sensors as well as many others. Most if not all of these applications are difficult to solve or unsolvable using conventional technology. The invention described herein solves the above problems by using a tube as a waveguide for sonic waves and measuring the changes to these waves as the tube is stretched or radially compressed. In this manner the problems discussed above, as well as many others, are alleviated or solved by the tubular sonic displacement sensor described in the paragraphs below.

SUMMARY OF THE INVENTION

The displacement sensor of this invention comprises a tube combined with a sonic transmitter and receiver. The tube acts as a waveguide for the sonic waves and a processor determines whether the tube has changed in length or has been constricted which, in either case, changes the pattern of sonic waves traveling from the transmitter to the receiver. In some applications, the transmitter and receiver are at different ends of the tube. In these cases, the attenuation in sound energy reaching the receiver, caused by the tube being squeezed at at least one point, is measured and the amount of cross action area reduction is determined. In other applications, the transmitter and receiver are at the same end of the tube and, in some of these cases, the transmitter and receiver are the same transducer. When the transmitter and receiver are at the same end of the tube, the receiver receives sonic waves reflected from a constriction in the tube and the time between transmission and reception of the waves permits the processor to determine the location along the tube of the constriction. The measuring device of this invention can also be used to measure the change in length of the tube or effective length, such as when the tube is partially filled with a liquid.

The principal objects and advantages of this invention are:

1. To provide a long device for measuring a displacement perpendicular to the device taking place anywhere along the length of the device.
2. To provide a long tubular device where, when subjected to a displacement which changes the cross section area of the device at a location along its length, the location of the deformation can be determined.
3. To provide an obstruction sensor which can be readily mounted to door, door jamb, window frame, sunroof, trunk, or other such object which will detect when the object is in contact with an obstruction.
4. To provide a tubular shaped switch device having multiple functions wherein the particular function is determined by the location along the device where a depression occurs.
5. To provide a elongated displacement sensing device which will measure the amount of lengthening of the device.
6. To provide a device which, when used in conjunction with a vehicle seat, permits a measurement of the weight of an object occupying the seat.
7. To provide a tubular switch which closes when pushed by material displaced during a crash of a vehicle and which, due to the resiliency of the tube of the instant invention, resets if momentarily closed when the vehicle is not experiencing a crash.
8. To provide a device for measuring the level of a liquid in a tank, wherein the liquid flows into a tube and the height of the liquid in the tube is measured and the diameter of the tube is chosen to dampen the motion of the fluid within the tube.

9. To provide an obstruction sensor which can be readily incorporated into weather stripping or other trim products.

10. To provide a contact sensor for use to determine whether an occupant's head is in contact with a vehicle headrest or other similar application.

Other objects and advantages of the present invention will become apparent from the following description of the preferred embodiments taken in conjunction with the accompanying drawings.

BRIEF DESCRIPTION OF THE DRAWINGS

FIG. 10A is a view taken along lines 10A—10A in FIG. 10.

FIG. 10B is a view taken along lines 10B—10B in FIG. 10.

FIG. 10C is a view taken along lines 10C—10C in FIG. 10B with portions cut away and removed.

DESCRIPTION OF THE PREFERRED EMBODIMENTS

For the purposes herein "Sonic waves" means sound waves of any frequency including audible and ultrasound waves, and "Compliant tube" means a tube which can be elastically deformed either radially or axially depending on the application.

Figure 1:
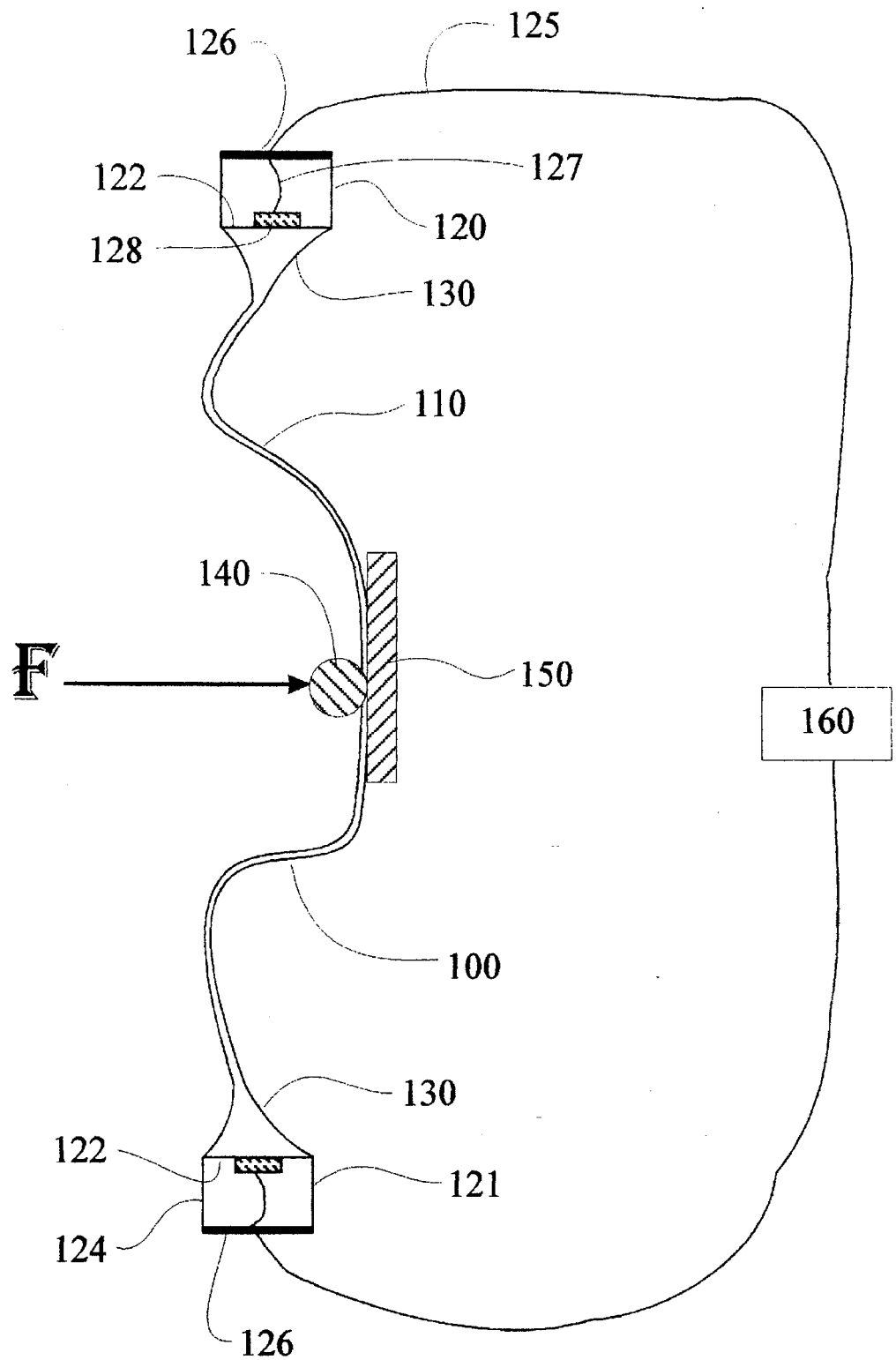
FIG. 1 is a cross section view of a displacement sensor of this invention showing a tube with a sonic transmitter attached to one end and a sonic receiver attached to the other end and an object deforming the tube.

A displacement sensor constructed in accordance with the teachings of this invention is shown generally at 100 in FIG. 1. It comprises a tube 110 made from a compliant material such as rubber or plastic. Sonic transducers 120 and 121 are attached to each end of the tube 110, through exponential cones 130. Both sonic transducers 120 and 121 have a flexible diaphragm 122, a housing 124, a base 126, a piezoelectric material 128, a wire 127 leading from the piezoelectric material 128 to the base 126 and a wire 125 leading to the control circuitry 160. There are of course other constructions of sonic transducers. The tube 110 is mounted along a part of its length to support member 150. An object 140 is shown depressing the tube against support 150 in the direction of the arrow F.

As object 140 compresses tube 110 the amount of sonic energy which is received by transducer 120 from transmitting transducer 121 is reduced until, when the tube is completely closed, little or no sonic energy is received. A microprocessor in control circuit 160 analyzes the data from receiver 120 to determine the amount that the tube 110 is compressed by object 140. If this device is used as an obstruction sensor in an automobile window, for example, the object 140 could be any obstruction in path of an automatically closing window such as a finger. When the microprocessor determines that the tube has been compressed by an appropriate amount to pose a danger to an occupant, the control circuit signals the window controller to stop closing the window. The sensitivity of this system can be adjusted to sense very small pressures, well below the federal requirements for such systems. The system can be designed to monitor the normal sonic resistance of the tube and only respond to differences from the normal. In this manner, aging effects can be automatically compensated for and a high sensitivity maintained. Systems using metal conductors such as tape switches are by nature significantly less sensitive since the spacing of the contacts must be maintained during the life of the vehicle. As a result, significantly greater force is required to activate the contact system.

The system shown in FIG. 1 can be used to either measure the amount of deflection of the tube or to act as a switch as in the case of an obstruction sensor. Thus, both proportional or analog information and digital information is available. Typically the frequency of the transducers lies between 20 and 500 kHz. The exponential horns 130 guide the ultrasonic waves into and out of a tube 110 so as to cause a minimum of reflection of the waves back to the transmitter 121 at the transmitting end of the tube 110 and to allow for the optimum expansion of the waves at the receiving end of the tube 110.

Figure 2:
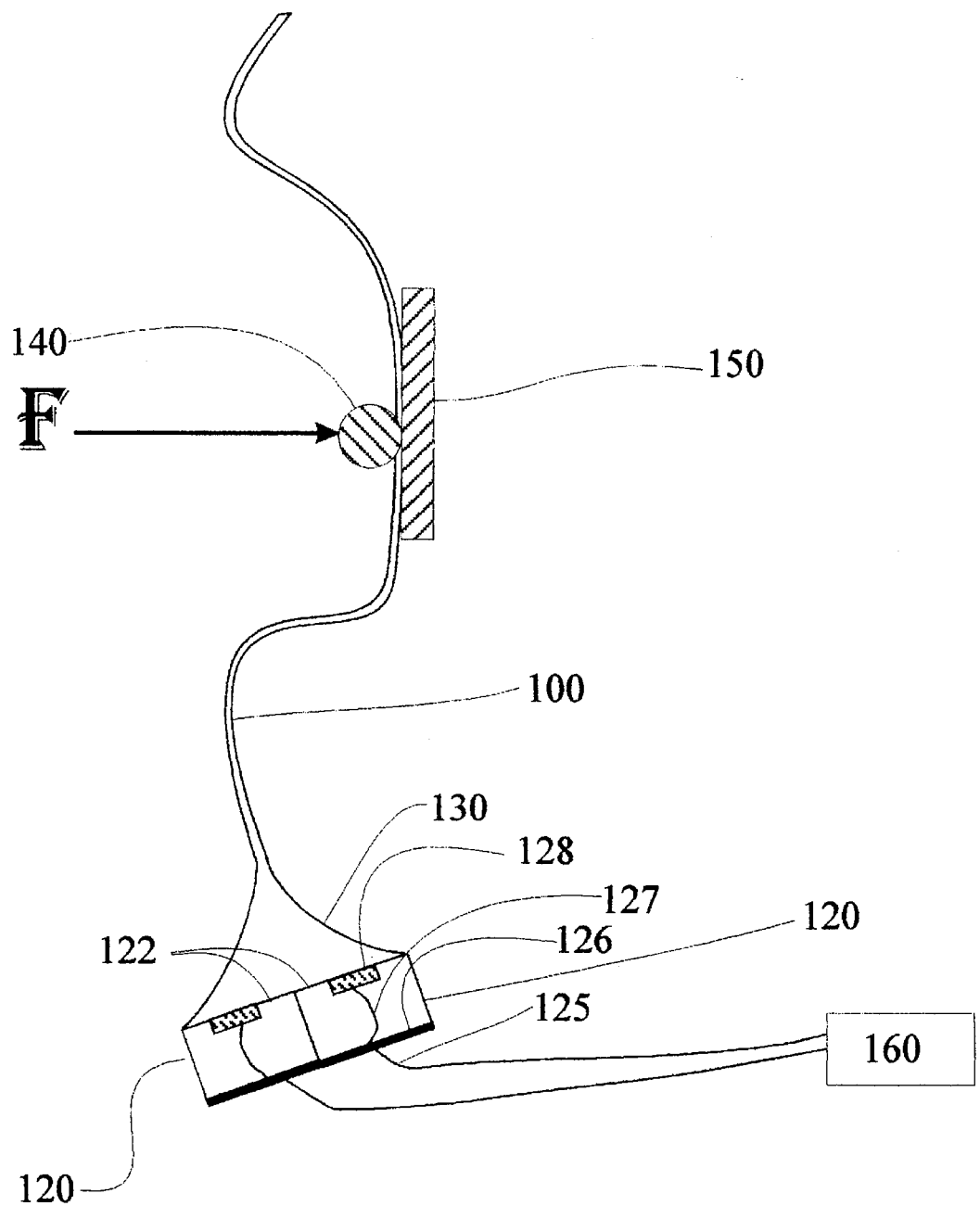
FIG. 2 is a view of the apparatus of FIG. 1 wherein the transmitter and receiver are positioned at the same end of the tube.

For many applications it is preferable to place the transmitter and receiver at the same end of tube 110, as shown in FIG. 2, which is a view of apparatus similar to that of FIG. 1. Like numbers are used to represent pans having the same function here and in the other drawings herein. In this case, the sonic waves are reflected from the compressed tube where object 140 squeezes tube 110 against support 150. In this case, the distance from the compressed pan of the tube to the transducers can be determined based on the time required for the sonic waves to travel from the transmitter to the obstruction and back to the receiver.

Figure 3:
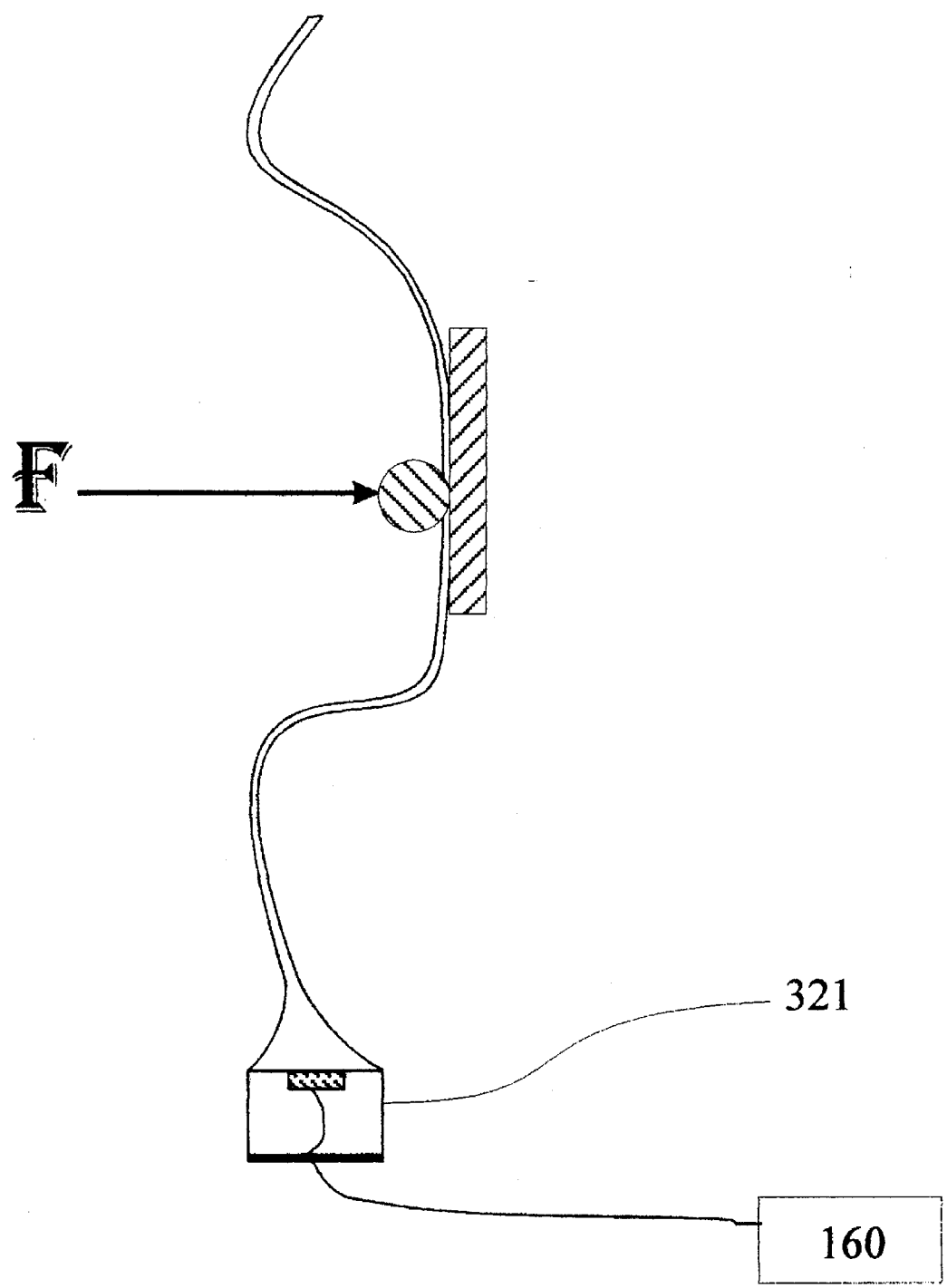
FIG. 3 is a view of the apparatus of FIG. 1 wherein the same transducer is used both as the transmitter and receiver.

In some cases the same transducer can be used to both transmit and receive the sonic waves as shown as 321 in FIG. 3. This depends on the Q of the transducer, the frequency, and the minimum distance which is to be measured. A transducer cannot transmit and receive at the same time and after the transmitter is done transmitting there needs to be some settling time before the transducer can act as a receiver. If the Q is low (say around 3), the frequency is high (100 kHz for example), and the minimum distance to be measured is at least 3 centimeters, a single transducer can be used for both transmitting and receiving. Other combinations of Q, frequency and distance will, of course, also work.

The Q of an electrical circuit is the ratio of the inductance to the resistance and is a well known concept to electrical engineers. For the acoustic transducer discussed here, it has a similar definition. It can be measured by the time required for the oscillations in a circuit to die out and thus it is a measure of the time which must be waited between the transmission and the reception of a signal to allow for the oscillations to decay.

Figure 4:
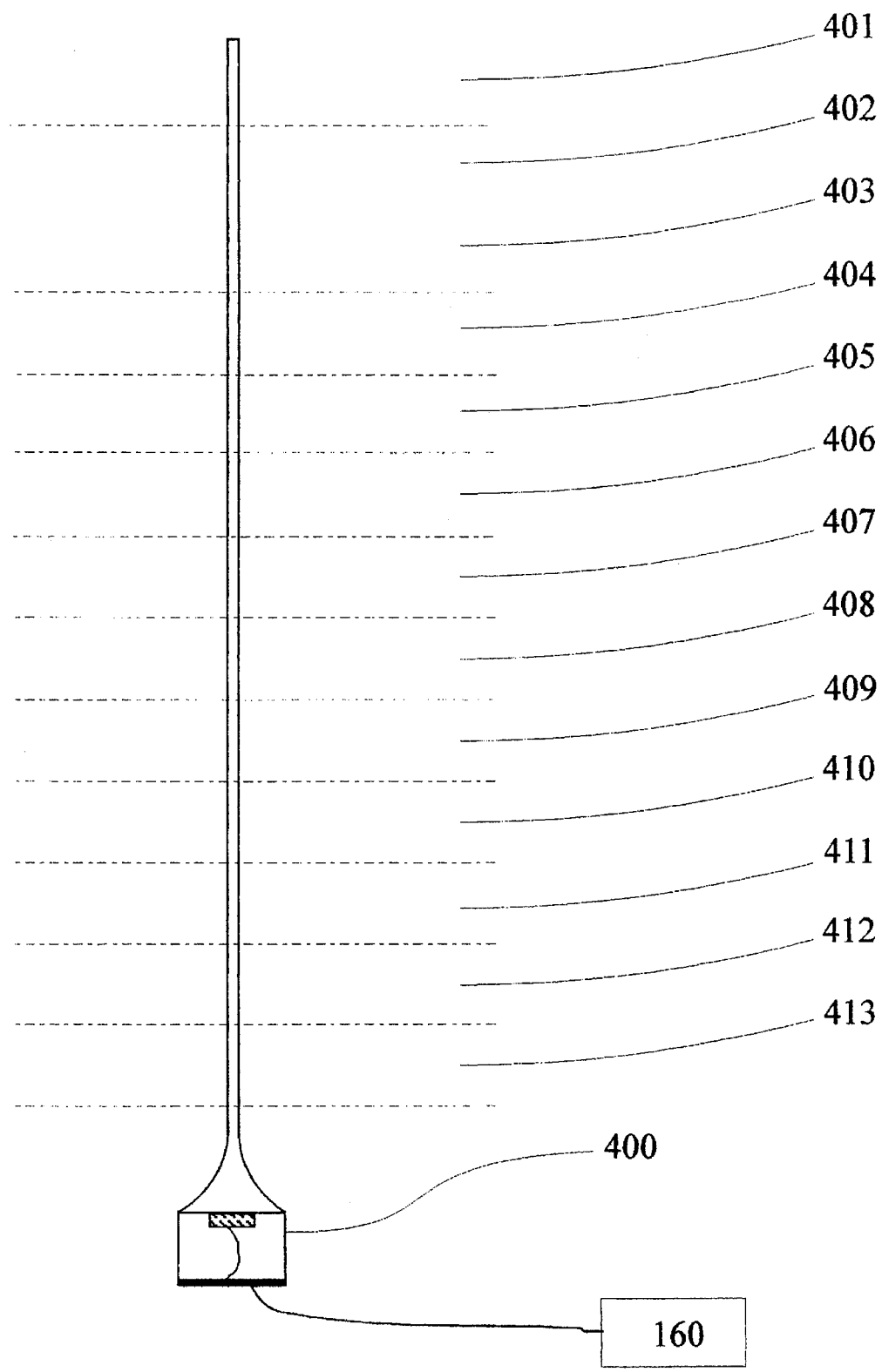
FIG. 4 is a cross section view of a device of this invention used as a multi-option switch depending on where along its length the tube is depressed.

The place along length of tube where it is displaced cannot be determined if the transmitter and receiver are at different ends since only the amount of energy would decrease and not the time between the transmission and reception. When the transmitter and receiver are located at the same end of the tube, the time between transmitting and receiving a wave is a measure of the distance to the point where the waves are reflected and the transmitter. This feature can be used to determine where the tube is being depressed and this information can be used to provide, for example, a switch function which depends on which part of the switch is pressed. FIG. 4 is a perspective view of such a device of this invention used as a multi-option switch depending on where along its length the tube is depressed. In FIG. 4 the multiple function switch is shown generally at 400. It has 13 sections labeled 401 to 413 which are distinguishable by microprocessor 160. This switch, therefore, can be used to perform 13 separate functions depending on where the switch is depressed. Such a device could be placed on an automobile steering wheel for example to control the turn signals, headlights, radio, heating and air-conditioning, and many other functions. Thus, this one simple device replaces many separate devices resulting in greater reliability and lower cost.

A digital system was illustrated in FIG. 4 wherein if a particular section was depressed it was sensed as either an on or off condition. Each section could alternately be used as an analog device, that is, the amount of depression can be ascertained and used to control some other system. The amount of depression of section 409, for example, could indicate the interior temperature which the driver of an automobile desires, or the amount of delay in an intermittent windshield wiper system. Thus, this device in its simplest implementation performs functions similar to those now performed by a simple tape switch with the advantage that a particular orientation need not be maintained and the device can be easily and arbitrarily bent about any axis. In a more complex implementation, this device greatly exceeds the capabilities of a tape switch by providing information as to where the switch is the depressed and the amount that it is depressed. This added capability comes at virtually no increase in cost over a tape switch. The cost of the added electronics is usually more than offset by the reduced cost of a simple tube compared to the dual conductors of a tape switch.

Figure 5:
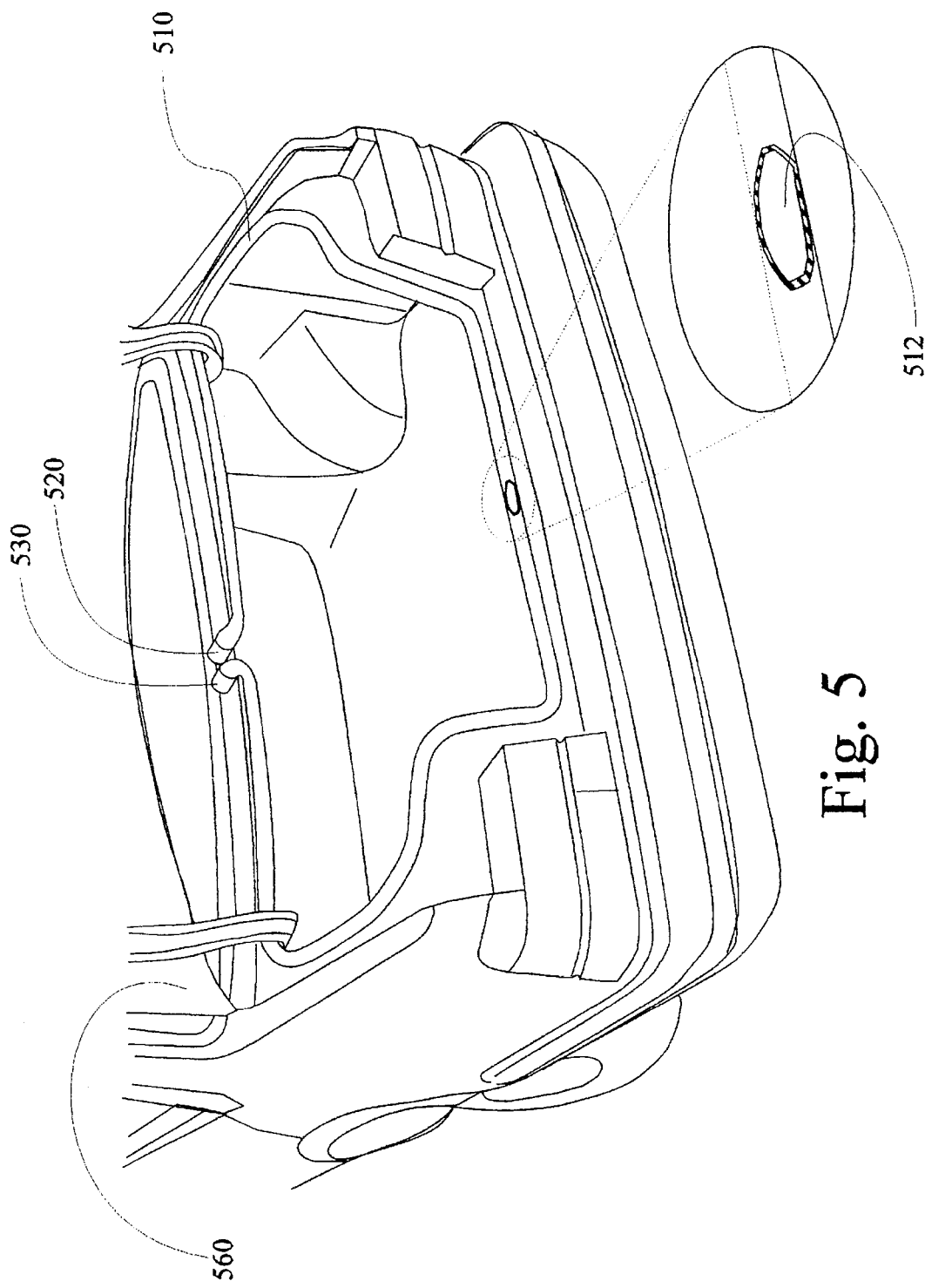
FIG. 5 is a perspective view of an obstruction sensor of this invention shown integral with weather stripping mounted onto a vehicle trunk.

Automobile manufacturers now provide, on several vehicle models, a system which automatically opens the trunk of the vehicle. When the driver of the vehicle wishes the trunk to open, he or she typically opens the glove compartment and presses a button. On some luxury automobiles it is now desired to have a system which automatically closes the trunk upon the push of a button. Such a system could injure a person, who perhaps is not even seen by the driver, if the person had a finger or other appendage in the path of the closing trunk lid. Before such an automatic trunk lid closing system can be implemented, a system for sensing obstructions in the path of the closing lid is required. Such a system is illustrated in FIG. 5 which is a perspective view of an obstruction sensor of this invention shown integral with weather stripping mounted onto a vehicle trunk. The weather stripping 510 contains a hole 512 through which the sonic waves pass from transmitter 520 to receiver 530. Any obstruction trapped between lid 560 and weather stripping 510 will cause weather stripping 510 to compress thereby reducing the cross section of the hole 512 in tube 510 and, correspondingly, the sonic energy received at receiver 530 will be reduced. A control circuit, not shown, monitors the amount of sonic energy received and stops the lid closing process when an obstruction is detected.

A similar system could be used with the hood, door, window, sunroof, or other similar type device. Some of these will be illustrated below. An important feature of this device as used in the trunk implementation is the ability to use the weather stripping as the waveguide for the ultrasonic waves. Thus, a single component can be used for multiple purposes significantly reducing the cost of the obstruction sensor. It is very difficult to apply a tape switch, for example, to this application due to the complex shape of the trunk opening. Incorporating a tape switch into the weather stripping, even if possible, would have the effect of substantially increasing the cost of the weather stripping. This is particularly true since a tape switch can only be bent about one axis whereas the weather stripping must follow the torturous path of the trunk opening.

Figure 6:
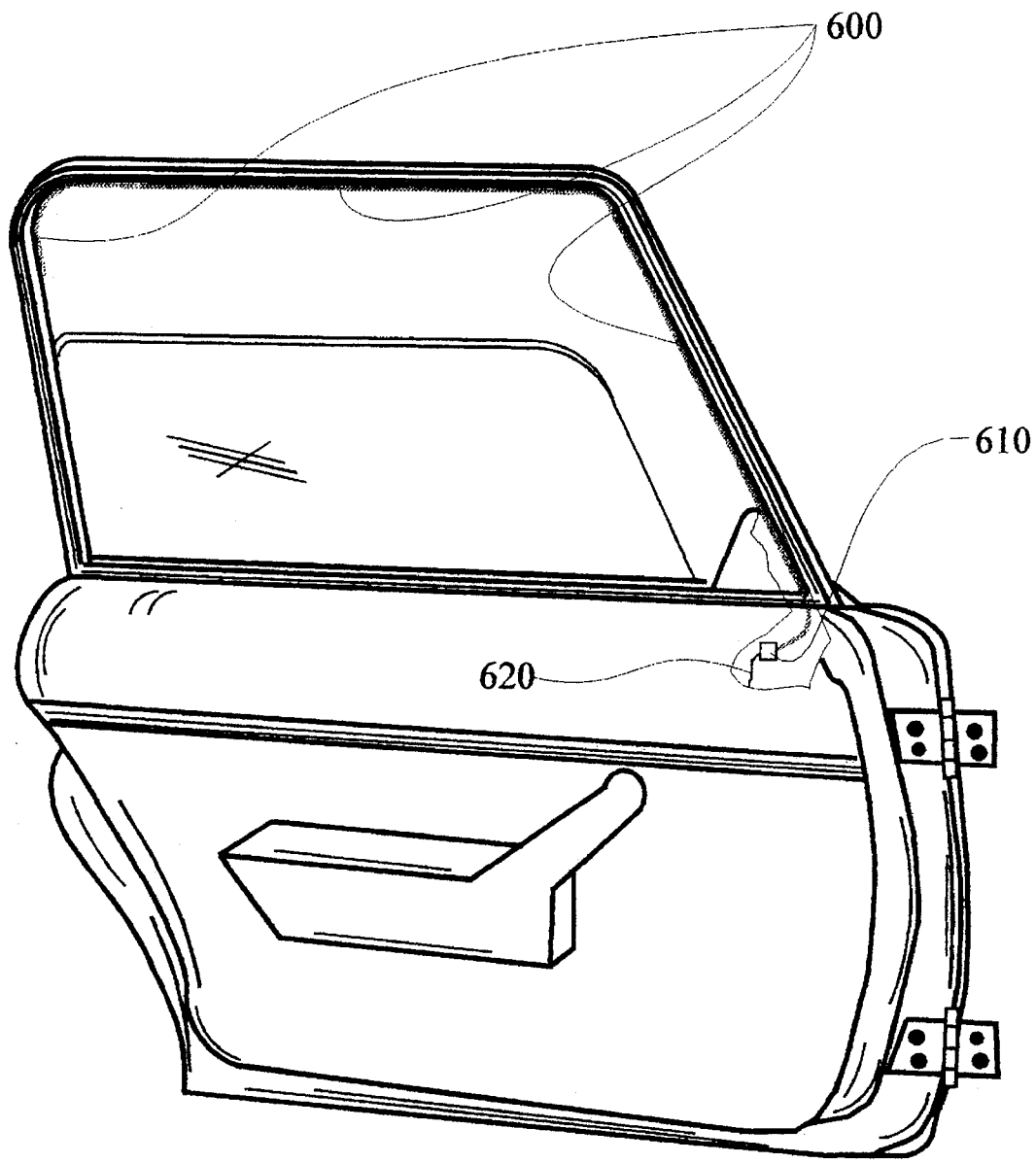
FIG. 6 is a perspective view of an obstruction sensor of this invention shown mounted onto the window frame of an automobile with a portion cutaway and removed.

Another application is illustrated in FIG. 6 which is a perspective view of an obstruction sensor of this invention shown mounted onto the window frame of an automobile. The obstruction sensor tube is shown generally at 600 and the transducer and control circuit assembly at 610. A wire 620 leads to the zone module which controls the motion of a window. Once again, any obstruction will be trapped between the closing window 630 and the obstruction sensor 600 causing the obstruction sensor tube to be compressed which is sensed, by the change in reflection of the sonic waves, by control circuit 610.

Figure 7:
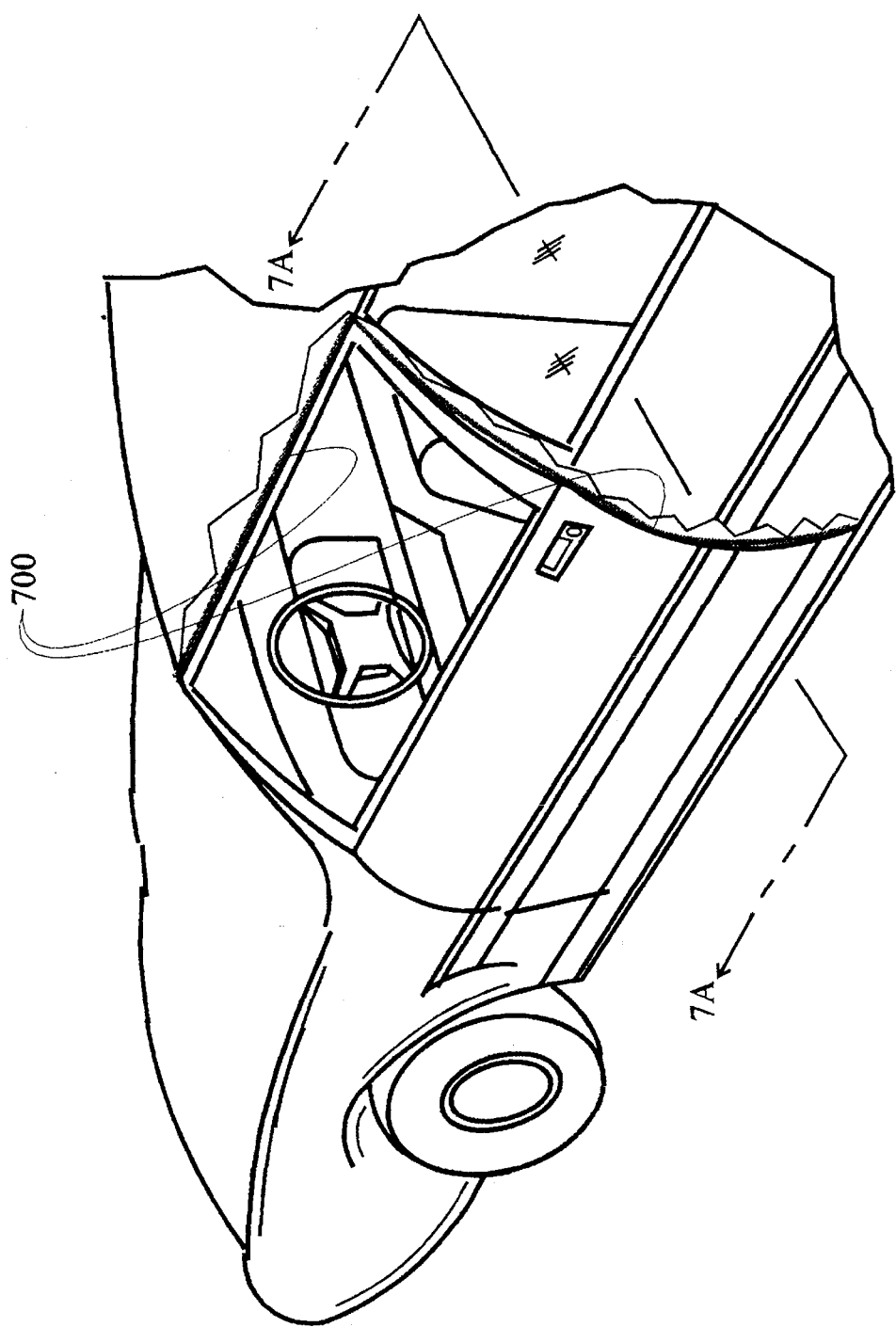
FIG. 7 is a perspective view of an obstruction sensor of this invention shown mounted onto the door of an automobile.
Figure 7A:
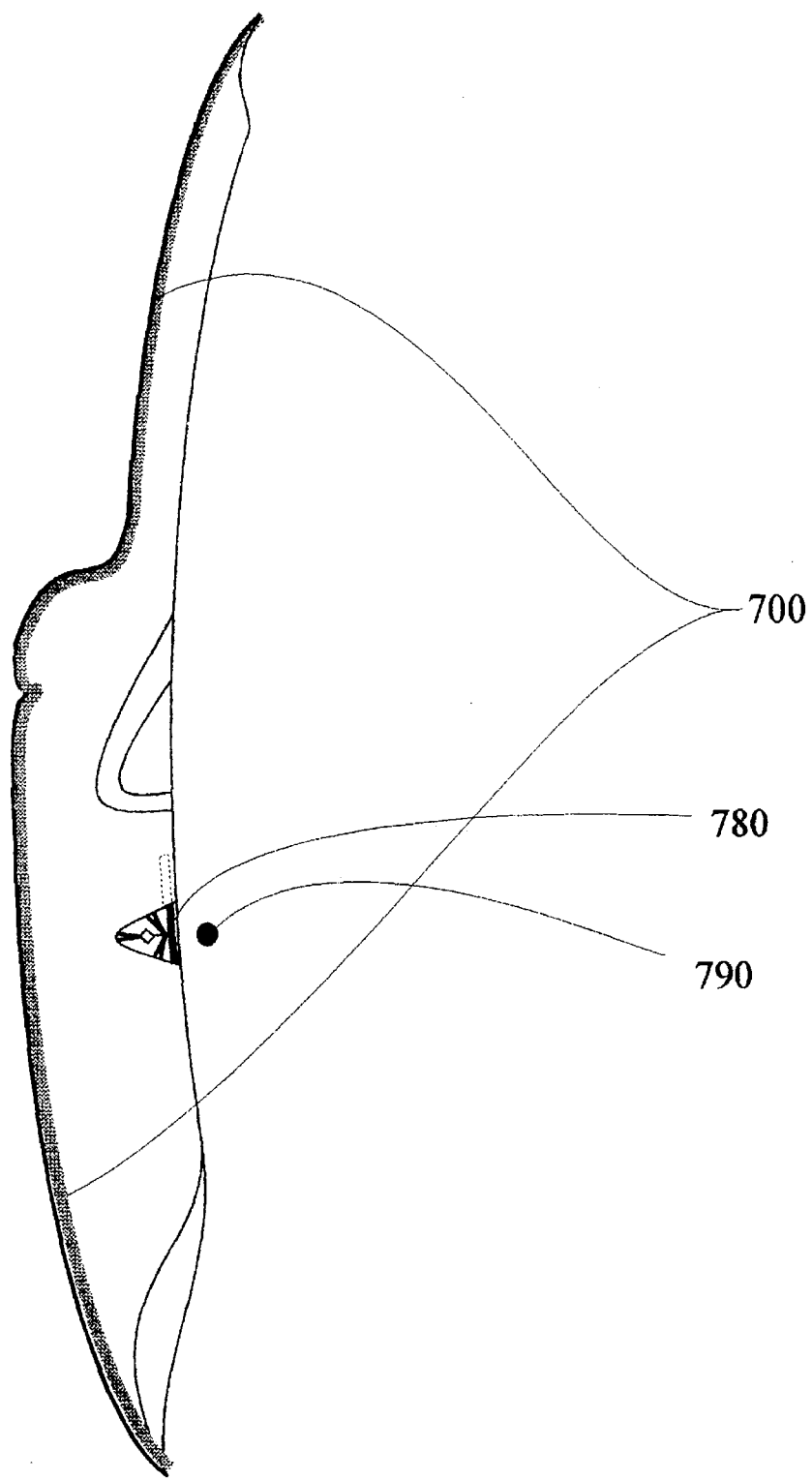
FIG. 7A is a view taken along lines 7A—7A in FIG. 7.

In FIG. 7 the displacement sensor 700 of this invention is shown mounted onto the door of an automobile. Naturally, this system is designed to sense obstructions, such as the fingers of a child, which might get caught between the door and door jamb. In the event such an obstruction is detected, the door is prevented from closing completely by a rod 780 shown in FIG. 7A which is a view taken along line 7A—7A of FIG. 7. Alternately, the door latching mechanism can be disabled in such a manner as to prevent the striker pin on the door jamb from entering the door latch. In another implementation, the obstruction sensor can be located on the door jamb rather than the door. The operation of either system is as described above wherein the reduction in a cross section of the tube is sensed by means of a reduction in the amount of sonic energy transmitted through the tube.

The rod 780 is positioned so as to prevent door closure as the default. Only when there is no obstruction sensed will the rod 780 be removed just in time for the door to close completely. The same system can be used to sense that the door is ajar thus eliminating the current door open sensor.

Figure 8:
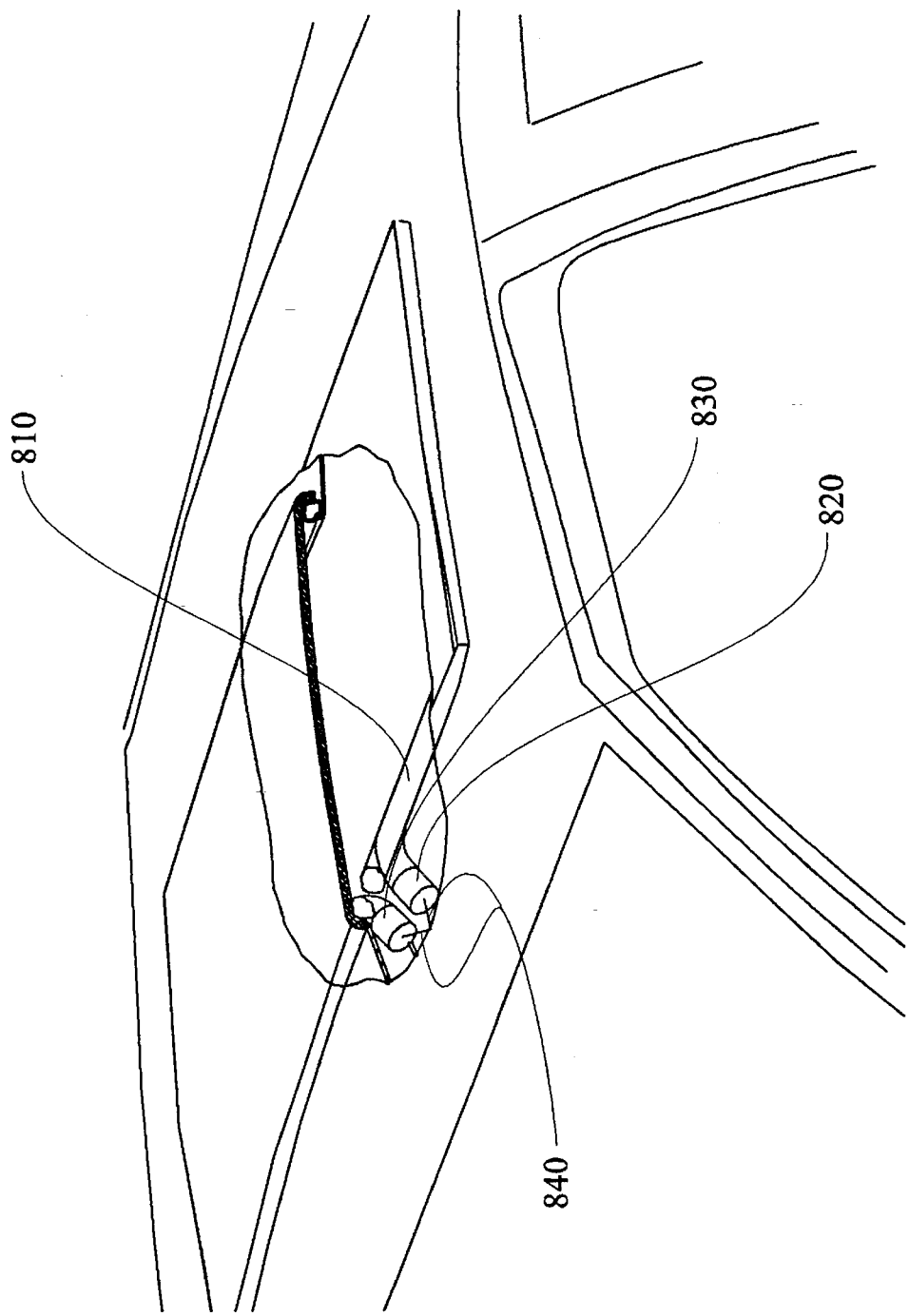
FIG. 8 is a perspective view, with portions cut away and removed, of an obstruction sensor of this invention shown mounted onto a sunroof of an automobile.

Another application is illustrated in FIG. 8 which is a perspective view of an obstruction sensor of this invention shown mounted onto a sunroof of an automobile. Sunroofs now sometimes have an obstruction sensor which operates by sensing the torque on the motor which operates the sunroof. These systems are marginally effective since the friction in the mechanism varies with environmental conditions and with the age of the vehicle. As a result, if the system functions well initially and does not put excessive force on a finger, for example, later it senses an obstruction when none exists due to increased friction in the mechanism. Consequently, manufacturers of sunroofs have been searching for improved systems whose characteristics do not change from time to time. In FIG. 8 the tube 810 extends completely around the sunroof to serve the dual purpose of a weather seal and tube for the obstruction sensor. Transmitter 820 transmits sonic energy into tube 810 where, if there is no obstruction, it is received by receiver 830. Wires 840 connect the system to the control circuitry as described above.

Figure 9:
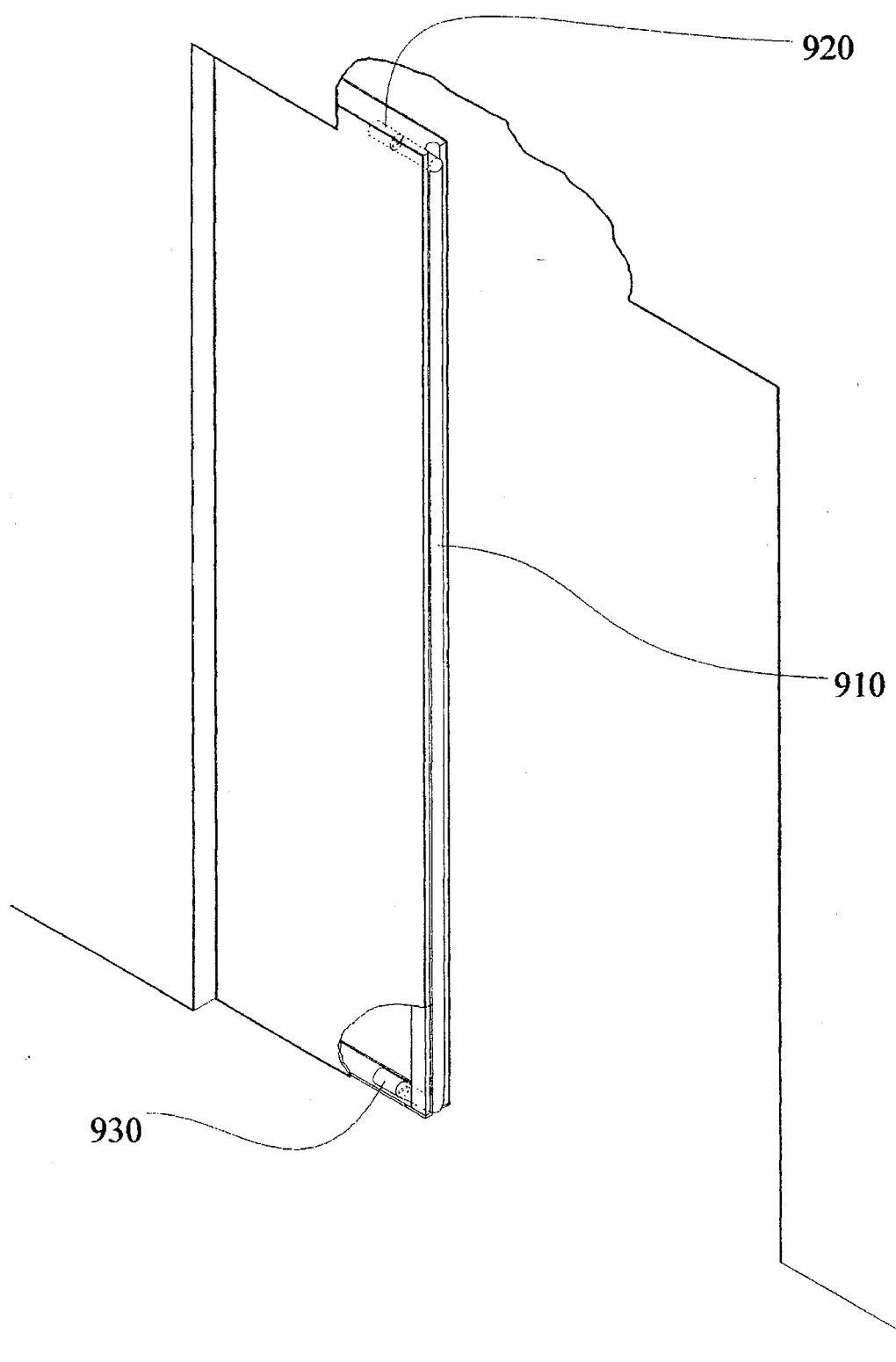
FIG. 9 is a perspective view of an obstruction sensor of this invention shown mounted onto an elevator door.

The mechanisms used on elevator doors to sense that an obstruction is in the path of the closing door are usually cumbersome and expensive. Frequently, the entire edge of the door is depressed inward to where a microswitch is closed stopping the door. Sometimes complicated optical systems are used and in other cases other sensing means are employed. In almost all cases, the mechanism is complicated. In contrast, the obstruction sensor of this invention results in a simpler less expensive device. One key advantage of the systems disclosed herein is that the hole inside the tube can be any shape or size. Since a small deflection can be sensed a rather large bumper system containing a large hole can be used. This is illustrated in FIG. 9 which is a perspective view of an obstruction sensor of this invention shown incorporated onto the bumper of an elevator door. The bumper serves as the tube for the waveguide for the sonic waves which travel from transmitter 920 to receiver 930 as described above. In this case only a small motion of the outer edge of the bumper is required to indicate that an obstruction is present.

Figure 10:
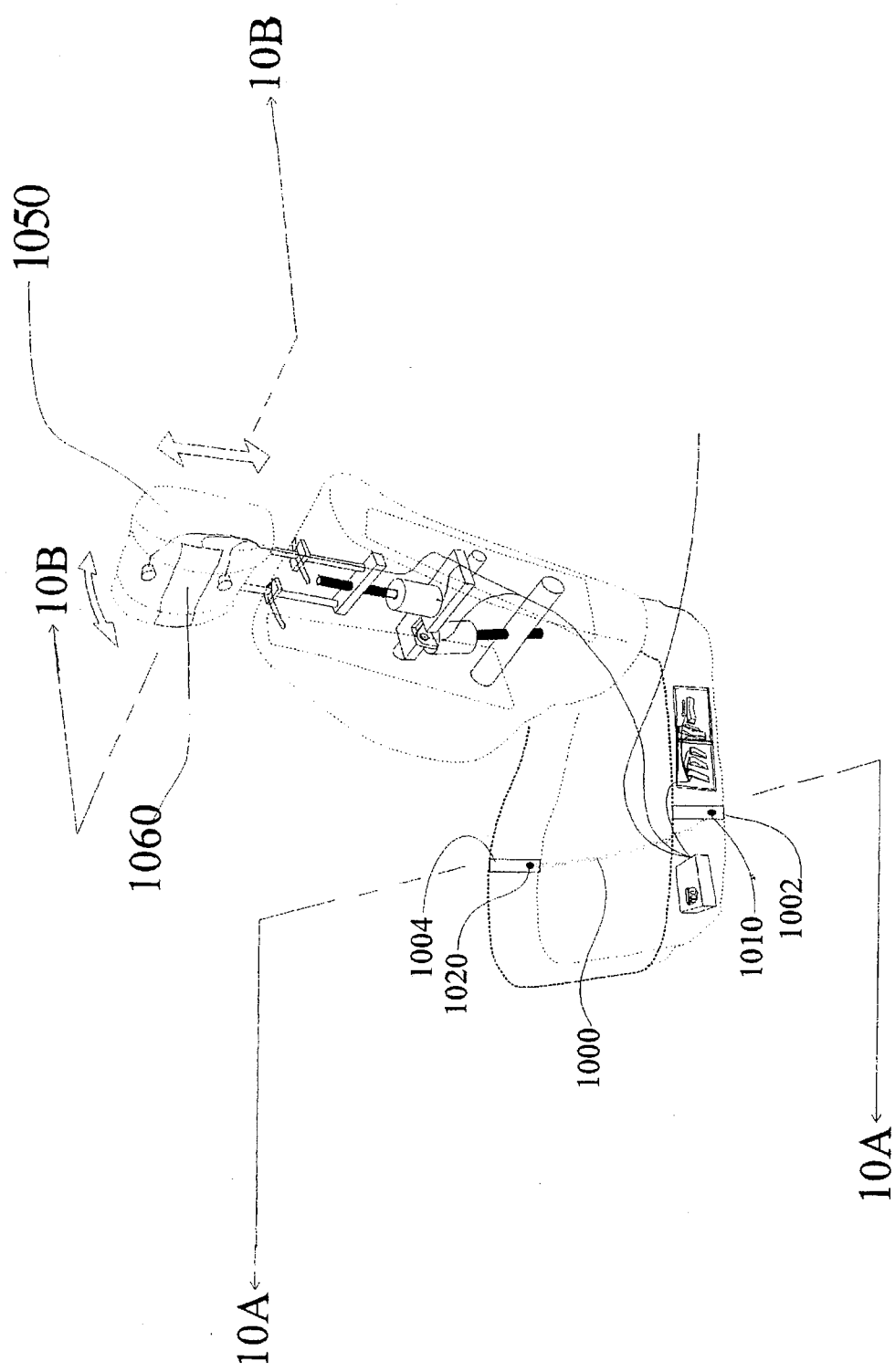
FIG. 10 is a perspective view of an weight sensor of this invention shown mounted onto the seat of an automobile with the seat shown in phantom and showing apparatus for controlling the position of the headrest with a head contact system also utilizing the displacement sensor of this invention.

In all of the cases discussed and illustrated above, the change in cross section area of the tube was sensed based on the attenuation in the amount of sonic energy which traveled through the tube or on the amount of sonic energy which was reflected by the obstruction. In the example of FIG. 10, the change in length of the tube is measured which is used as a measure of some other parameter. In particular, in FIG. 10, the lengthening of the tube is used to measure the weight of an occupying item of the seat of an automobile. In FIG. 10 a perspective view of a weight sensor of this invention shown mounted onto the seat of an automobile. This figure also illustrates apparatus for controlling the position of the headrest with a head contact device which also utilizes the displacement sensor of this invention.

A description of the operation of the headrest position control apparatus is described in detail in copending patent application ****(ATI 112) which is included herein by reference. In FIG. 10, displacement sensor 1000 is supported from supports 1002 and 1004. Transmitter 1010 and receiver 1020 function in the same manner as the corresponding parts discussed above. Referring now to FIG. 10A, which is a view of the apparatus of FIG. 10 taken along line 10A—10A, the seat 1030 is constructed from a foam layer 1032 which is supported by a spring system 1034 which is in contact with the displacement sensor 1000 of this invention. As weight is placed on the seat surface 1036 it is supported by spring 1034 which deflects downward causing tube 1000 to stretch axially. The deflection sensor tube 1000 is constructed of a coil spring 1014 surrounded by a rubber tube 1018. This construction permits the tube 1000 to expand axially without compressing radially. Thus, in contrast to the examples given above, the sonic energy traveling from the transmitter to the receiver is not attenuated. Instead, the length which the sonic waves must travel is increased. Since the speed of sound in the tube is known, approximately 1080 feet per second, and since the exact time of initiation of the transmission of the sonic waves from the transmitter is known, the time delay between transmission and reception can be calculated and is a direct measurement of the length of the tube, and thus an indicator of the weight on the seat. The exact relationship between weight and tube lengthening is generally determined experimentally for this application.

The application of this invention to sensing contact is also illustrated in FIG. 10. During the operation of the automatic headrest positioner described in the above referenced patent application, in the event of an anticipated rear impact, the headrest 1050 is rapidly moved until it contacts the head of the occupant. This contact with the occupant's head is sensed by contact sensor 1060. This sensor is shown in more detail in FIG. 10B which is a view taken along line 10B—10B of FIG. 10. The sensor uses an elliptically shaped tube 1070 approximately one inch wide and ¼ inch high. It is connected on one end to transmitter 1080 and on the other end to receiver 1090.

Figure 11:
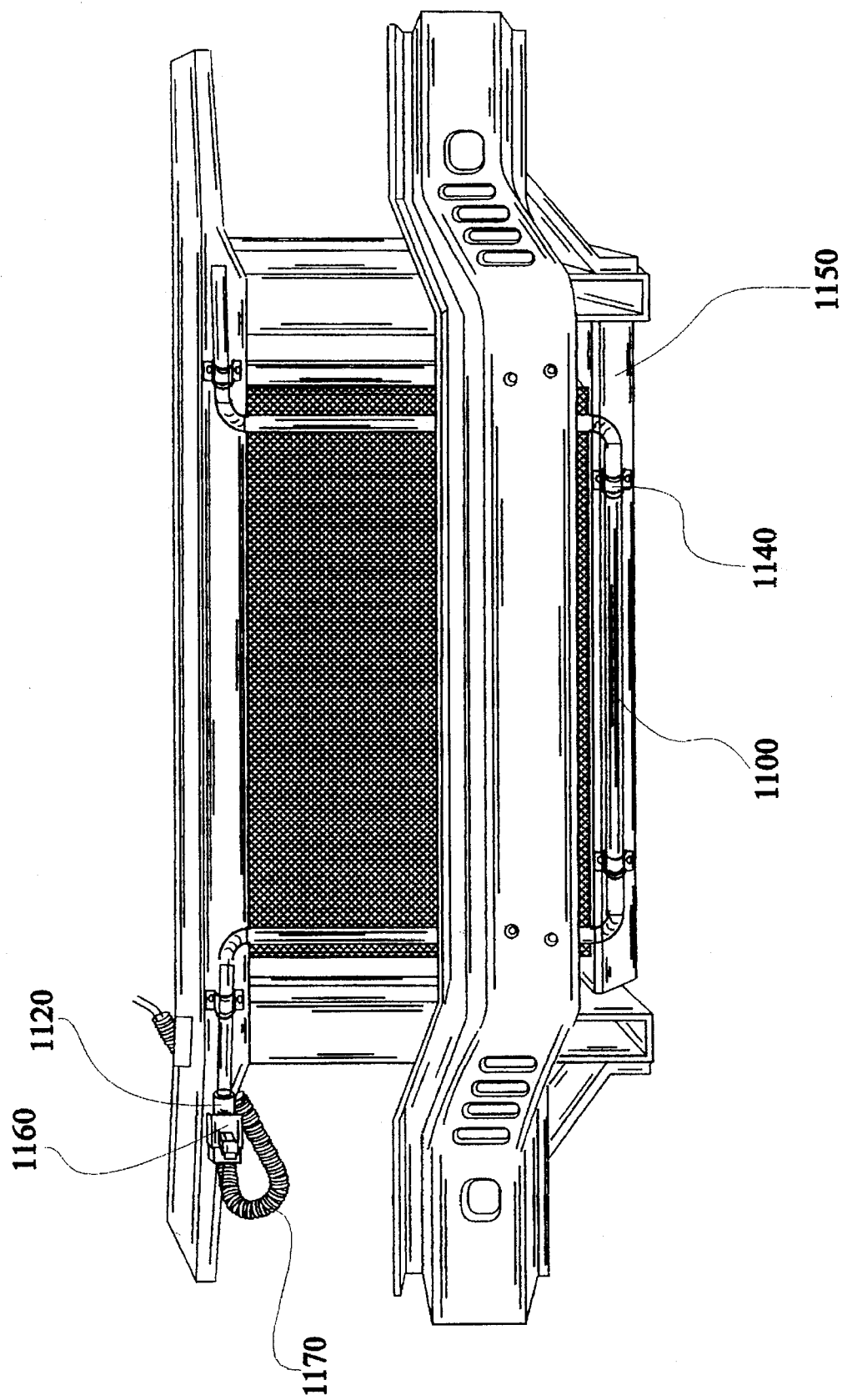
FIG. 11 is a perspective view of a crush switch sensor for use as an automobile crash sensor for frontal impacts.

In U.S. patent application Ser. No. 08/024,076 filed Mar. 1, 1993, a crash sensor based on vehicle crush is disclosed wherein the sensor is constructed from a rod inside a tube. When the sensor is bent or crushed to where the rod contacts the tube, deployment of the airbag is enabled. The displacement sensor described herein can also be used in a similar manner as illustrated in FIG. 11 which is a perspective view of a crush sensor for use as an automobile crash sensor for frontal impacts, shown mounted onto the front radiator structure of the vehicle. The remainder of the vehicle has been removed. Naturally, this sensor could also be mounted on the side of an automobile to sense side impacts or near the rear of the vehicle to sense rear impacts. The use of the displacement sensor of this invention has several advantages over that described in the referenced patent application. In the rod-in-tube crash sensor, the tube is a conductor of electricity and therefore, since it is part of the sensor switch, it must be insulated from the vehicle. Secondly, if the rod-in-tube sensor is accidentally bent, such as might happen during routine vehicle maintenance, the sensor might close when there is no accident. In this case it would need replacing before the vehicle is driven otherwise there would be a significant risk of an inadvertent airbag deployment since the sating sensor, which is now all that is preventing the airbag from deploying in many systems, will trigger on minor impacts or even on rough roads. Thirdly, since the displacement sensor described herein can be made from somewhat flexible tubing, it can more easily be installed in a motor vehicle.

The tube of the present invention triggers on having the cross section area reduced which only happens if the tube cross section is deformed as by being crushed. In contrast, the rod-in-tube sensor triggers by being bent. If the tube of this invention is made more rigid, it can be made to operate in the same manner as the rod-in-tube sensor since any bending will also cause the tube to kink and therefore crush. On the other hand, the tube can be made quite flexible and resilient wherein only a crushing of the tube will reduce the cross section area and cause the sensor to trigger the deployment of the airbag.

In FIG. 11, the displacement sensor tube 1100 is attached to the vehicle radiator support structure 1150 by means of brackets 1140. The combined transmitter and receiver 1120 operates as described above. The sensor is connected to the control circuitry by means of connector 1160 and wire 1170. When the vehicle crushes to where the sensor is located, the tube 1100 is deformed which is sensed as described above.

Figure 12:
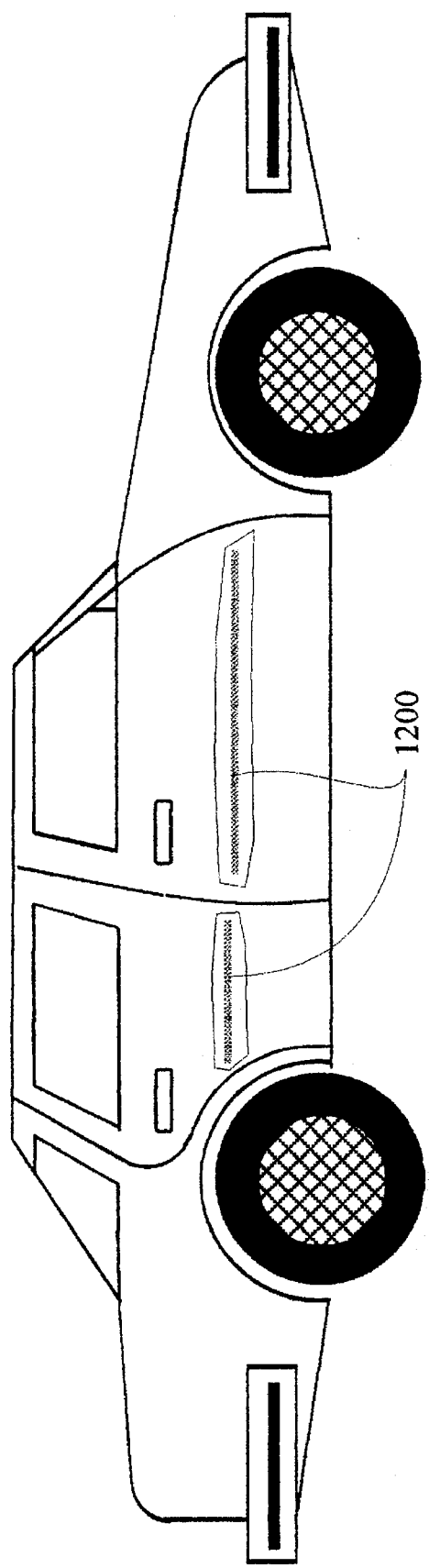
FIG. 12 is a perspective view of a crush switch sensor for use as an automobile crash sensor for side impacts.
Figure 13:
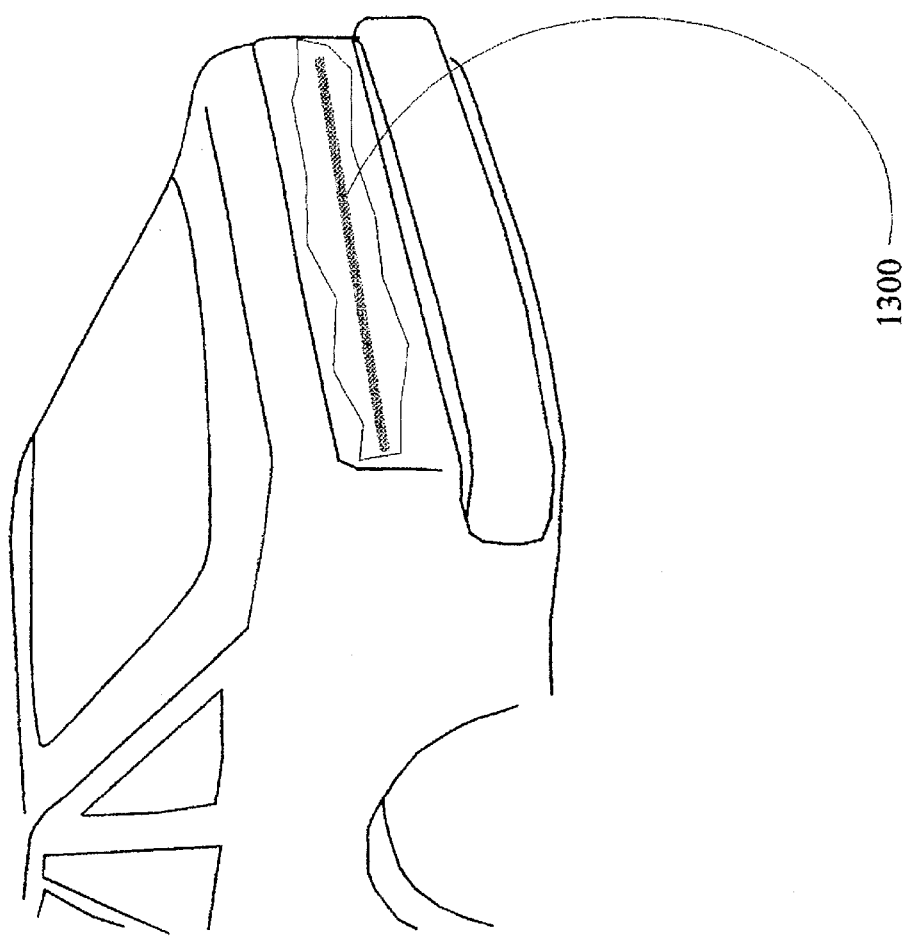
FIG. 13 is a perspective view, with portions cut away and removed, of a crush switch sensor for use as an automobile crash sensor for rear impacts.

FIG. 12 illustrates the placement of the deflection sensor on the side of the vehicle inside each of the doors for use as a crush sensor, and therefore as an automobile crash sensor, for side impacts. Similarly FIG. 13 illustrates the use of the displacement sensor 1300 for sensing rear impacts.

Figure 14:
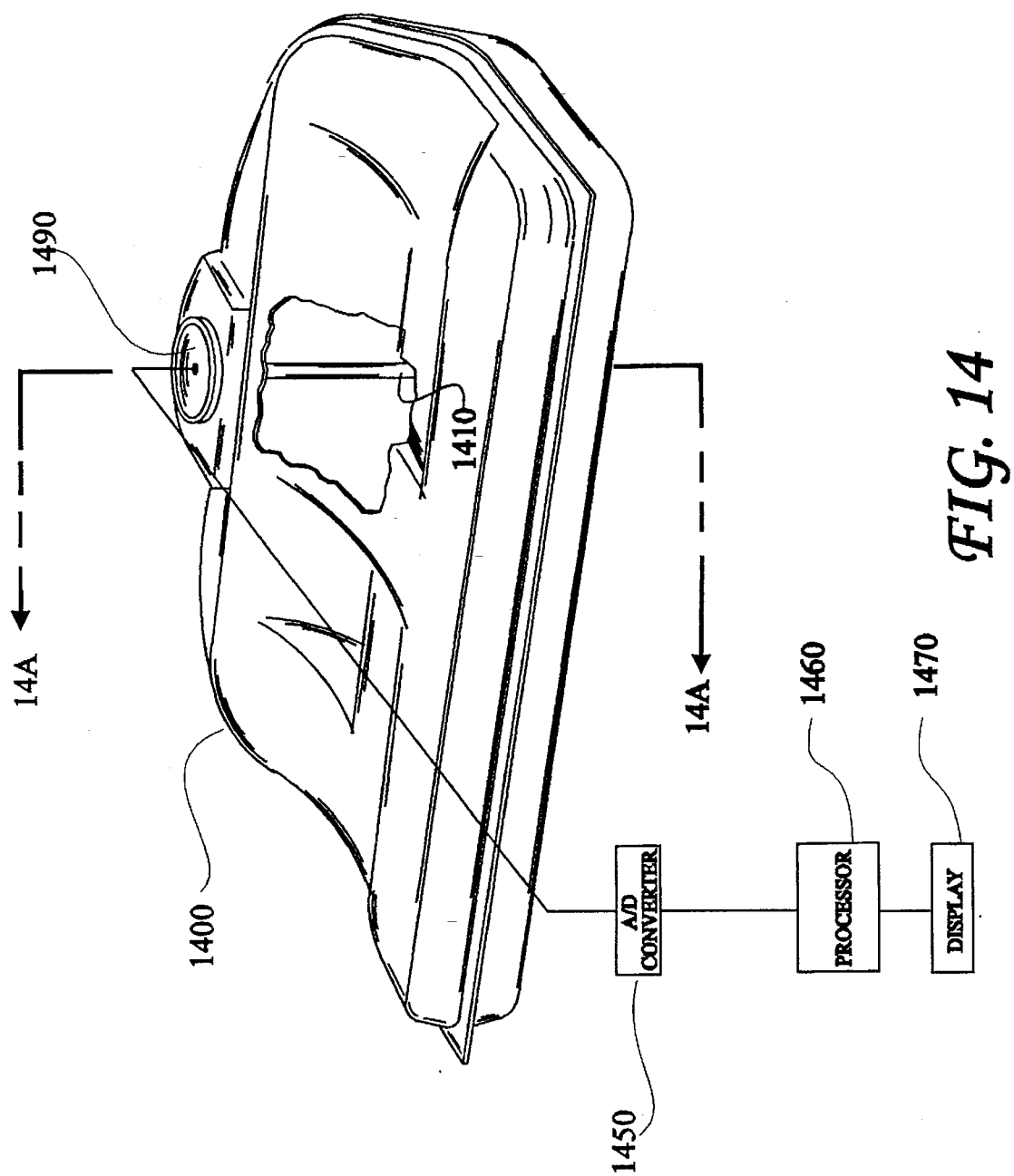
FIG. 14 is a perspective view of a liquid level sensor for use as an automobile fuel gage shown in an automobile fuel tank with portions cut away and removed.

In copending U.S. patent application Ser. No. 08/239,977 filed May 9, 1994, which is included herein by reference, an accurate fuel gage is disclosed. In some implementations of the teaching of that patent application, a liquid level sensing device is used. Several such devices are described and illustrated in that patent application including the use of an ultrasonic transducer. The displacement sensor of this invention can also be used to measure the level of a liquid inside a tube as illustrated in FIG. 14, which is a perspective view of a liquid level sensor for use as an automobile fuel gage. One advantage of this device is that the diameter of the tube 1410 can be chosen at will to dampen the fluctuations in liquid level within the tube. Also, this liquid level sensor requires much less space than other sensors such as the float sensor now universally used.

Figure 14A:
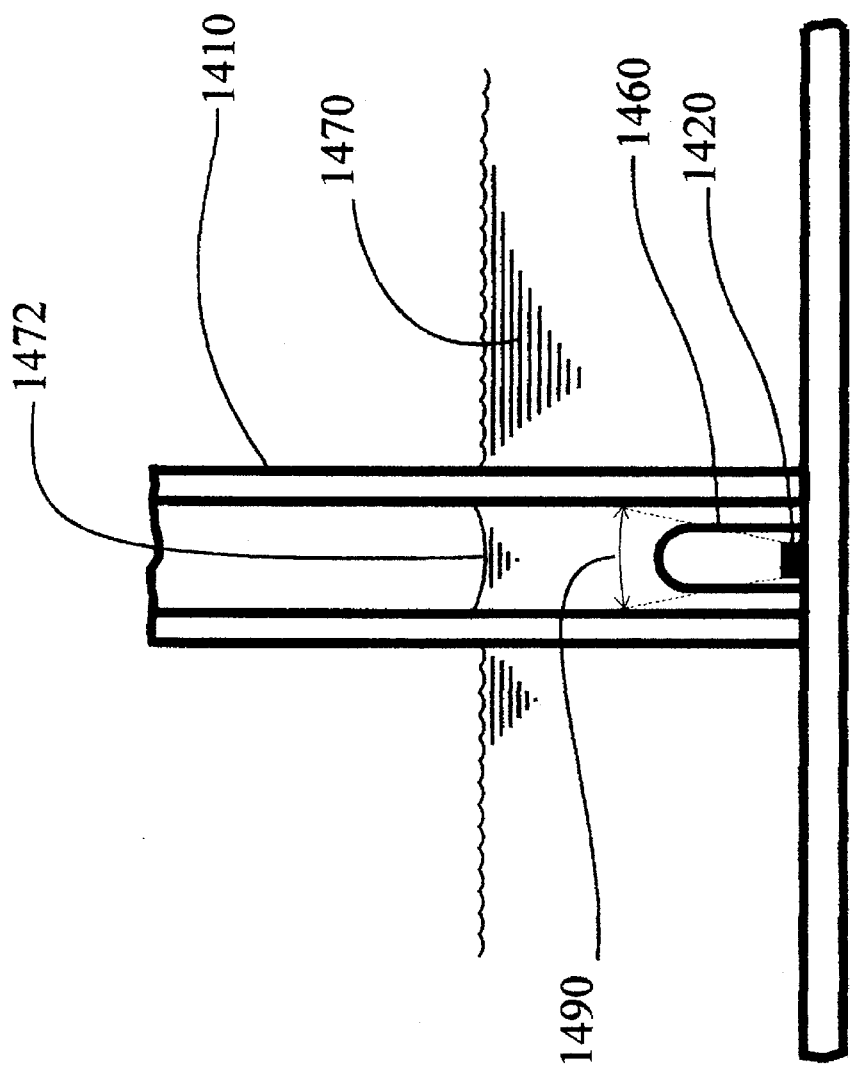
FIG. 14A is a view taken along lines 14A—14A in FIG. 14.

FIG. 14A is a view taken along lines 14A—14A in FIG. 14. Ultrasonic transmitter and receiver 1420 rests on the bottom of the fuel tank and transmits ultrasonic waves upward toward surface 1472 of fuel 1470. Openings 1460 are provided in the bottom of the tube to permit fuel to flow in and out of the tube. The height of these openings is chosen so that the ultrasonic waves emitted by the transducer 1420 do not reach the tube walls until after passing the openings. In this way the ultrasonic waves are not reflected from the tops of the openings. In a typical application, a 200 kHz transmitter and receiver is used which has a spread angle of 20 degrees. The tube illustrated here is approximately 0.25 inches in diameter. For other cases the tube may the as large as one inch in diameter. The particular choice depends on the characteristics of the fuel, the tank size and depth and the dynamic environment of the tank. A larger diameter tube will provide faster response and a smaller diameter tube provides greater damping of liquid level. This is because there is less resistance to the flow of the fuel into the larger tube than into a smaller tube. Thus, the level in the larger tube will change as the level in the tank adjacent the tube changes, whereas the level in the smaller tube will change much more slowly and thereby average out the level fluctuations due to sloshing etc. In some cases where it is desirable to measure the level down to nearly the bottom of the tank, the transmitter/receiver is placed in a horizontal section of tube to permit a longer travel distance for the sonic waves and thus provide for some settling time for the transducer between transmitting and receiving.

Several application are described above which illustrate many of the objects and advantages sought for this invention. Some additional facts which may not be evident include, first, the ability to use tubes with very small diameter bores, less than 1/16 of an inch for example, and large diameter bores exceeding several inches. Second, since the attenuation in the ultrasonic energy as it travels through the tube is quite small, very long tubes can be used. Third, since the device does not use electrical conductors within the tube, it can be placed in explosive environments, for example, where electricity cannot be used. Fourth, the hole through which the sonic waves travel need not be round and it can even change shape without significantly affecting the device. Since tape switches have a defined geometry it is frequently difficult to implement tape switches when the geometry of the application changes significantly. This is particularly a problem when the path of the device does not lie in a plane. For these and other reasons their are many applications where this device can be used and other devices such as tape switches cannot.

Although several preferred embodiments are illustrated and described above, there are other possible combinations using different sizes or shapes of waveguides or different frequencies of sonic waves, for example, that perform the same functions. There are also numerous additional applications in addition to those described above. This invention is not limited to the above embodiments and should be determined by the following claims.

We claim:

1. A device for determining the displacement of an object relative to a stationery support comprising:
   a) a compliant tube having two ends and a bore therein, said bore of said tube having a length, said tube being in contact with said object and positioned so that the displacement of said object against said tube relative to said support causes said tube to deform to thereby decrease the cross section area at some location along said length of said bore of said tube;
   b) a sonic transmitter attached to one end of said tube;
   c) a sonic receiver attached to one end of said tube; and
   d) processor means connected to said sonic transmitter and said sonic receiver;
   wherein said processor means causes said sonic transmitter to send sonic waves into said tube where said sonic waves are modified by the amount of change of said tube bore cross section area at said location along said length of said bore, after which, said modified waves are received by said receiver which produces a signal which is processed by said processor means to determine the amount of constriction of said tube caused by said object.

2. The invention in accordance with claim 1 wherein said receiver is at a different end of said tube from said transmitter.

3. The invention in accordance with claim 1 further comprising an output signal from said processor means when said amount of constriction exceeds a predetermined value.

4. The invention in accordance with claim 1 wherein said receiver is at the same end of said tube as said transmitter.

5. The invention in accordance with claim 4 wherein i) at least some of said modified waves are reflected back to said receiver from the location of said tube bore cross section area change, and ii) said processor means calculates the distance to said location from the time required for said waves to travel from said transmitter to said receiver.

6. The invention in accordance with claim 5 further comprising an output signal from said processor means when said location of said deflection exceeds a first predetermined distance from said transmitter along said length and is less than a second predetermined distance.

7. A device for detecting an obstacle in the path of a moving object against a stationery support comprising:
   a) a compliant tube having two ends and a bore therein, said bore having a length, said tube positioned against said support to contact said obstacle when said obstacle is in the path of said moving object so that said obstacle contacts and causes a deformation of said tube decreasing the cross section area at some location along said length of said bore of said tube;
   b) a sonic transmitter attached to one end of said tube, said sonic transmitter producing sonic waves within said tube;
   c) a sonic receiver attached to one end of said tube, said sonic receiver receiving said sonic waves produced by said transmitter and producing an electric signal representative of said received sonic waves; and
   d) detection means electrically connected to said sonic receiver, said detection means providing an output signal when said electric signal deviates by a predetermined amount from a signal characteristic of when no obstacle is in contact with said tube;
   wherein said sonic transmitter sends sonic waves into said tube where said sonic waves are modified by the change of said tube bore cross section area, after which, said modified waves are received by said receiver which produces an electric signal representative of said modified waves, and said electric signal is fed into said detector which determines whether an obstruction is present and if so provides said output signal.

8. The invention in accordance with claim 7 wherein said moving object is a door.

9. The invention in accordance with claim 7 wherein said moving object is a window.

10. The invention in accordance with claim 7 wherein said moving object is a sunroof.

11. The invention in accordance with claim 7 wherein said moving object is a vehicle trunk lid.

12. The invention in accordance with claim 7 wherein said tube is mounted on said moving object.

13. The invention is accordance with claim 7 wherein said tube is mounted on a fixed object of said stationery support in the path of said moving object.

14. A device for determining the displacement of an object relative to a stationery support comprising:
   a) a tube having two ends and a bore therein, said tube constructed of elastomeric and reinforcing materials permitting axial stretching of said tube but resisting radial deformation, said tube in contact with said object and having said two ends each connected to a point of said support and positioned to elongate in response to the normal displacement of said object against said tube;
   b) a sonic transmitter attached to one end of said tube, said sonic transmitter producing sonic waves within said tube in response to an electric signal;
   c) a sonic receiver attached to one end of said tube, said sonic receiver receiving said sonic waves produced by said transmitter and producing an electric signal representative of said received sonic waves; and,
   d) processor means electrically connected to said sonic transmitter and said sonic receiver,
   wherein, said processor means produces an electric signal which is fed into said sonic transmitter causing it to send sonic waves into said tube to said receiver, said receiver receives said sonic waves and produces said representative electric signal which is processed by said processor means to determine the amount of elongation of said tube caused by said object based on the time it takes for said waves to travel from said transmitter to said receiver.

15. The invention in accordance with claim 14 wherein said object further comprises an elastically supported platform for supporting an article there on and the normal displacement of said platform is representative of the weight of said article, and said amount of elongation of said tube is representative of the weight of said article.

16. The invention in accordance with claim 14 wherein said platform is the seat of a vehicle and said article rests on said seat.

17. A device for determining the crush of a vehicle experiencing a crash comprising:
   a) a compliant tube having two ends and a bore therein, said tube positioned on said vehicle so that the crush of a portion of said vehicle contacts and causes said tube to deform thereby decreasing the cross sectional area of said bore at some location along said length of said bore of said tube;
   b) a sonic transmitter attached to one end of said tube, said sonic transmitter producing sonic waves within said tube;
   c) a sonic receiver attached to one end of said tube, said sonic receiver receiving sonic waves produced by said transmitter and producing an electric signal representative of said received sonic waves; and
   d) detection means electrically connected to said sonic receiver, said detection means providing an output signal when said received signal deviates from a normal signal characteristic of no tube deformation by a predetermined amount, said output signal indicating that said crush of said vehicle has occurred;
   wherein, said sonic transmitter sends said sonic waves into said tube where said sonic waves are modified by the change of said tube bore cross sectional area caused by a crushing of a portion of a vehicle which deforms and contacts said tube, after which, said modified waves are received by said receiver which produces said representative electrical signal which is fed into said detector which determines whether said crush has occurred and if so provides said output signal.

18. The invention in accordance with claim 17 wherein said device is mounted adjacent the rear of a vehicle to sense rear impacts.

19. The invention in accordance with claim 17 wherein said device is mounted adjacent the side of a vehicle to sense side impacts.

20. The invention in accordance with claim 17 wherein said device is mounted adjacent the front of a vehicle to sense frontal impacts.

* * * * *